(12) United States Patent
Oishi et al.

(10) Patent No.: US 12,479,389 B2
(45) Date of Patent: Nov. 25, 2025

(54) VEHICLE

(71) Applicant: HONDA MOTOR CO., LTD., Tokyo (JP)

(72) Inventors: Kenichi Oishi, Tokyo (JP); Tomohiro Nishida, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 402 days.

(21) Appl. No.: 18/206,109

(22) Filed: Jun. 6, 2023

(65) Prior Publication Data

US 2023/0398956 A1 Dec. 14, 2023

(30) Foreign Application Priority Data

Jun. 10, 2022 (JP) ................................. 2022-094475

(51) Int. Cl.
*B60R 21/13* (2006.01)
*B60J 1/00* (2006.01)
*B62D 25/07* (2006.01)
*B60R 21/00* (2006.01)

(52) U.S. Cl.
CPC .............. *B60R 21/13* (2013.01); *B60J 1/006* (2013.01); *B60J 1/007* (2013.01); *B62D 25/07* (2013.01); *B60R 2021/0018* (2013.01); *B60R 21/131* (2013.01); *B60R 2021/137* (2013.01)

(58) Field of Classification Search
CPC . B60R 21/13; B60R 21/131; B60R 2021/132; B62D 25/07; B60J 1/006; B60J 1/007
See application file for complete search history.

(56) References Cited

U.S. PATENT DOCUMENTS

| | | | |
|---|---|---|---|
| 8,997,908 B2* | 4/2015 | Kinsman | B62D 21/183 296/202 |
| 9,789,909 B2* | 10/2017 | Erspamer | B60N 2/68 |
| 9,994,088 B2 | 6/2018 | Roy | |
| 10,618,383 B2* | 4/2020 | Luo | B60J 1/025 |
| 12,077,130 B2* | 9/2024 | Hetland | B60R 11/0217 |
| 12,227,058 B2* | 2/2025 | Couture | B62D 27/06 |
| 2012/0217078 A1* | 8/2012 | Kinsman | B60K 17/34 280/756 |
| 2019/0232910 A1* | 8/2019 | Hisamura | B62D 27/065 |
| 2024/0317028 A1* | 9/2024 | McWhorter | B60J 1/06 |

* cited by examiner

*Primary Examiner* — Jason S Morrow
(74) *Attorney, Agent, or Firm* — Amin, Turocy & Watson, LLP

(57) ABSTRACT

This vehicle includes a roll bar assembled to an upper portion of a vehicle body and configured to separate off a passenger space, the roll bar includes a pair of left and right front roll bars and a cross member configured to connect the pair of left and right front roll bars, the front roll bars include windshield bars extending on both sides of a front portion of the roll bar in an upward/downward direction, respectively, and the cross member has a front panel portion along a reference surface that bridges between center axes of the pair of left and right windshield bars, a groove portion recessed rearward from a flat portion along the reference surface and extending in a vehicle width direction is formed in the front panel portion, and the groove portion is located lower in an outer end portion in the vehicle width direction than in a center portion in the vehicle width direction.

9 Claims, 9 Drawing Sheets

VEHICLE

CROSS-REFERENCE TO RELATED APPLICATION

The present application claims priority based on Japanese Patent Application No. 2022-094475, filed Jun. 10, 2022, the content of which is incorporated herein by reference.

FIELD OF THE INVENTION

Background of the Invention

The present invention relates to a vehicle.

Description of Related Art

In the related art, for example, in a vehicle for traveling on uneven ground, a roll bar is assembled to an upper portion of a vehicle body, a passenger space of a cabin upper portion is separated off by the roll bar, and further, a roof is attached to an upper portion of the roll bar. The roll bar includes a panel-shaped cross member disposed between upper portions of left and right front roll bars and connecting them, and an upper portion of a windshield is attached to the cross member (for example, see U.S. Pat. No. 9,994,088).

SUMMARY OF THE INVENTION

In the vehicle, during washing or the like of a vehicle, water easily enters and accumulates between a panel-shaped cross member and a windshield.

An aspect of the present invention is directed to efficiently draining water entering between a cross member of a front upper portion of a roll bar and a windshield in a vehicle including the roll bar that forms a cabin upper portion.

In order to accomplish the above-mentioned purposes, a vehicle according to an aspect of the present invention employs the following configurations.

(1) An aspect of the present invention includes a roll bar assembled to an upper portion of a vehicle body and configured to separate off a passenger space, the roll bar includes a pair of left and right front roll bars and a cross member configured to connect the pair of left and right front roll bars, the front roll bars include windshield bars extending on both sides of a front portion of the roll bar in an upward/downward direction, respectively, and the cross member has a front panel portion along a reference surface that bridges between center axes of the pair of left and right windshield bars, a groove portion recessed rearward from a flat portion along the reference surface and extending in a vehicle width direction is formed in the front panel portion, and the groove portion is located lower in an outer end portion in the vehicle width direction than in a center portion in the vehicle width direction.

According to the aspect of the above-mentioned (1), the cross member of the front upper portion of the roll bar has the front panel portion along the reference surface that bridges between the pair of left and right windshield bars, and the groove portion oriented in the vehicle width direction is formed in the front panel portion. Accordingly, when the windshield is attached to the front portion of the roll bar, the gap extending in the vehicle width direction (hereinafter, may be referred to as a gap for drainage) is formed between the groove portion of the front panel portion and the windshield. For this reason, water that enters between the front panel portion and the windshield during washing or the like of the vehicle is guided and drained to the outside of the cross member in the vehicle width direction through the groove portion (i.e., the gap for drainage). In this way, the water that enters between the cross member of the front upper portion of the roll bar and the windshield can be efficiently drained away.

(2) In the aspect of the above-mentioned (1), the roll bar may include a front upper cross roll bar configured to connect the pair of left and right front roll bars, and the cross member may be a reinforcement member overlapping the front upper cross roll bar in the upward/downward direction when the vehicle is seen in a front view and reinforcing the front upper cross roll bar.

According to the aspect of the above-mentioned (2), since the cross member that connects the pair of left and right front roll bars also functions as the reinforcement member of the front upper cross roll bar of the front upper portion of the roll bar, the front upper portion of the roll bar is effectively reinforced to easily maintain a passenger space. As a result, water that enters between the reinforcement member (i.e., cross member) of the front upper portion of the roll bar and the windshield can be efficiently drained.

(3) In the aspect of the above-mentioned (1), the cross member may have one end portion and the other end portion connected to the pair of left and right front roll bar, respectively, and the groove portion may be formed continuously to bridge between the one end portion and the other end portion.

According to the aspect of the above-mentioned (3), the groove portion is formed continuously from one end portion of the cross member to the other end portion. Accordingly, water that enters between the cross member and the windshield can be guided to the groove portion (the gap for drainage), and the water guided to the gap for drainage can be smoothly guided to one end portion and the other end portion outward in the vehicle width direction. Accordingly, the water that enters between the cross member and the windshield can be reliably drained to the outer side in the vehicle width direction through the gap for drainage.

(4) In the aspect of the above-mentioned (3), the groove portion may be inclined to be located further downward as it goes outward in the vehicle width direction.

According to the aspect of the above-mentioned (4), since the groove portion is inclined to be located downward outward in the vehicle width direction, water guided to the groove portion can be more smoothly guided outward in the vehicle width direction. Accordingly, the water that enters between the cross member and the windshield can be more reliably drained to the outside in the vehicle width direction through the groove portion.

(5) In the aspect of the above-mentioned (3), the cross member may have a width of the front panel portion in the upward/downward direction, which is greater in the one end portion and the other end portion than in a center portion between the one end portion and the other end portion in the vehicle width direction.

According to the aspect of the above-mentioned (5), the width of the front panel portion in the upward/downward direction is greater in the one end portion and the other end portion than in the center portion of the cross member. The one end portion and the other end portion of the cross member desirably increase the width of the front panel portion in the upward/downward direction in order to be connected to the pair of left and right front roll bars or fix the windshield or the like. For this reason, since the up-to-down width of the front panel portion is increased in both end portions of the cross member, both end portions of the cross member can be strongly connected to the pair of left and right front roll bars, and the windshield or the like can be easily fixed. In addition, in comparison with the case in which the up-to-down width of the entire front panel portion is increased, reduction in weight of the cross member can be achieved. Further, a field of view as seen forward and upward from a passenger space can be widened. In addition, the outer end portion of the groove portion can be located lower down.

(6) In the aspect of the above-mentioned (5), each of a lower end of the front panel portion and the groove portion may be formed in an arc shape protruding upward when the vehicle is seen in a front view.

According to the aspect of the above-mentioned (6), since the lower end of the front panel portion of the cross member is formed in an arc shape, in comparison with the case in which the lower end of the front panel portion is formed in a linear shape, the up-to-down width of the front panel portion on the outer side in the vehicle width direction can be easily increased. That is, the up-to-down width of the front panel portion can be formed to become larger from the center portion of the cross member toward the one end portion and the other end portion. In addition, since the lower end of the front panel portion is formed in a smooth arc shape, in comparison with the case in which the lower end of the front panel portion is formed in a bent shape, a step difference shape, or the like, it is possible to suppress stress concentration in the lower end of the front panel portion and increase strength of the front panel portion and the cross member.

In addition, since the lower end of the groove portion is formed in an arc shape along the lower end of the front panel portion, the lower end of the groove portion can be efficiently formed according to the shape of the lower end of the front panel portion. Further, water that enters between the cross member and the windshield can be smoothly guided to the outer side in the vehicle width direction along the lower end of the groove portion.

(7) In the aspect of the above-mentioned (6), a windshield fixing portion configured to attach a windshield may be provided on the front panel portion in the one end portion and the other end portion of the cross member.

According to the aspect of the above-mentioned (7), since the windshield fixing portion is provided on the front panel portion with the increased up-to-down width in the one end portion and the other end portion of the cross member, a degree of attachment freedom of the windshield can be increased using the front panel portion with the increased up-to-down width.

(8) In the aspect of the above-mentioned (3), the cross member may include an upper panel portion extending rearward from an upper end of the front panel portion, the cross member may have a width of the upper panel portion in a forward/rearward direction, which is greater in the one end portion and the other end portion than in a center portion between the one end portion and the other end portion in the vehicle width direction, and a roof fixing portion configured to attach a roof may be provided on the upper panel portion in the one end portion and the other end portion of the cross member.

According to the aspect of the above-mentioned (8), since the roof fixing portion is provided on the upper panel portion with the increased front-to-rear width in the one end portion and the other end portion of the cross member, a degree of attachment freedom of the roof can be increased using the upper panel portion with the increased front-to-rear width.

(9) In the aspect of the above-mentioned (8), the groove portion may be disposed to overlap an eaves portion of the roof when the vehicle is seen in a front view.

According to the aspect of the above-mentioned (9), since the groove portion is disposed to overlap the eaves portion of the roof when the vehicle is seen in a front view, appearance characteristics of the vehicle can be enhanced by hiding the groove portion with the eaves portion of the roof and making the groove portion less visible from outside of the vehicle.

According to the aspect of the present invention, in the vehicle including the roll bar that forms the cabin upper portion, water that enters between the cross member of the front upper portion of the roll bar and the windshield can be efficiently drained.

DESCRIPTION OF EMBODIMENTS

Figure 1:
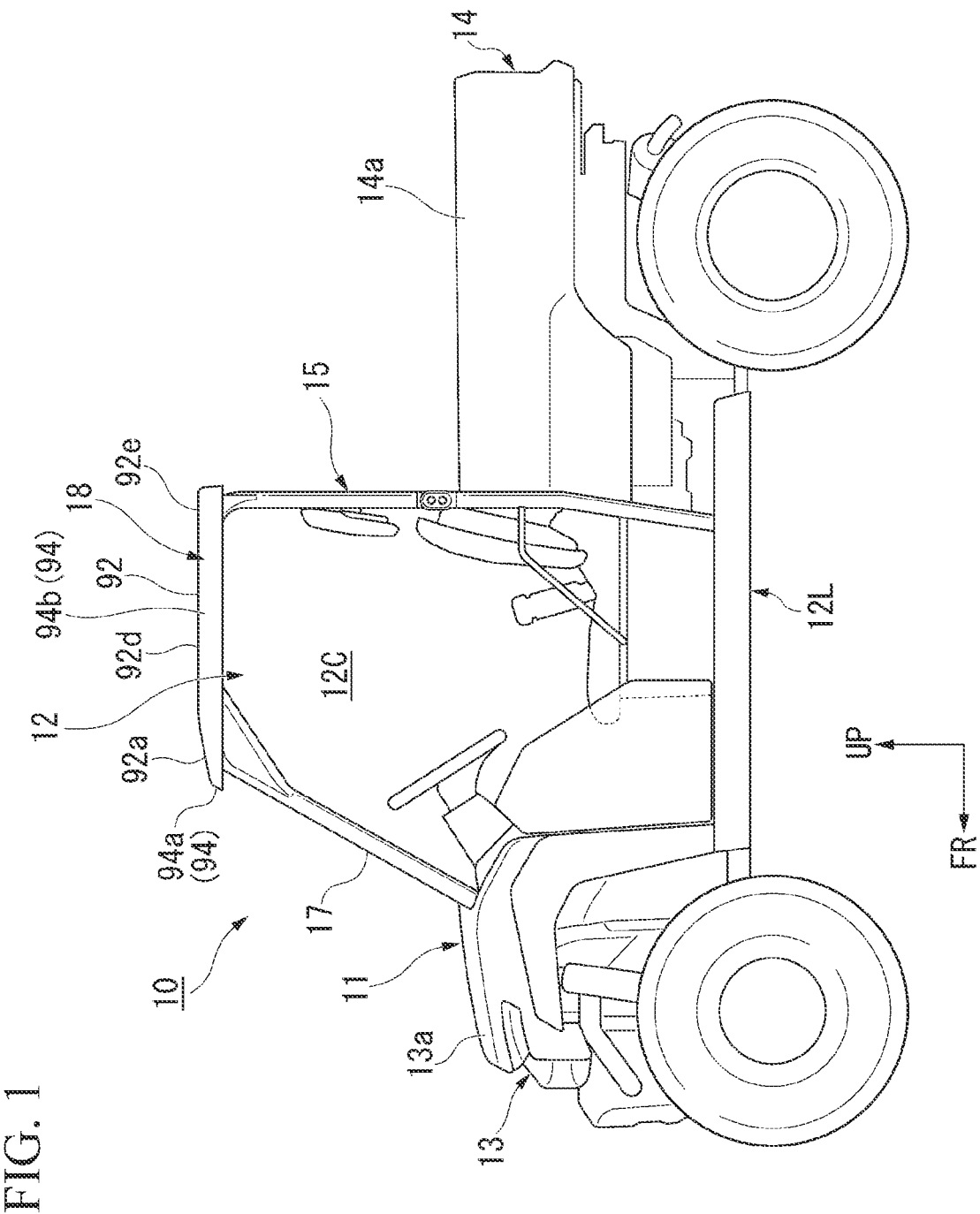
FIG. 1 is a left side view showing a vehicle of an embodiment according to the present invention.

Hereinafter, an embodiment of the present invention will be described with reference to the accompanying drawings. Further, directions of forward, rearward, leftward, rightward, and so on, in the following description are the same as directions in a vehicle described below unless the context clearly indicates otherwise. In addition, in appropriate places in the drawings used in the following description, an arrow FR indicates a forward direction with respect to a vehicle, an arrow LH indicates a leftward direction with respect to the vehicle, an arrow UP indicates an upward direction with respect to the vehicle, and a line CL indicates a lateral center of the vehicle.

<Vehicle>

Figure 2:
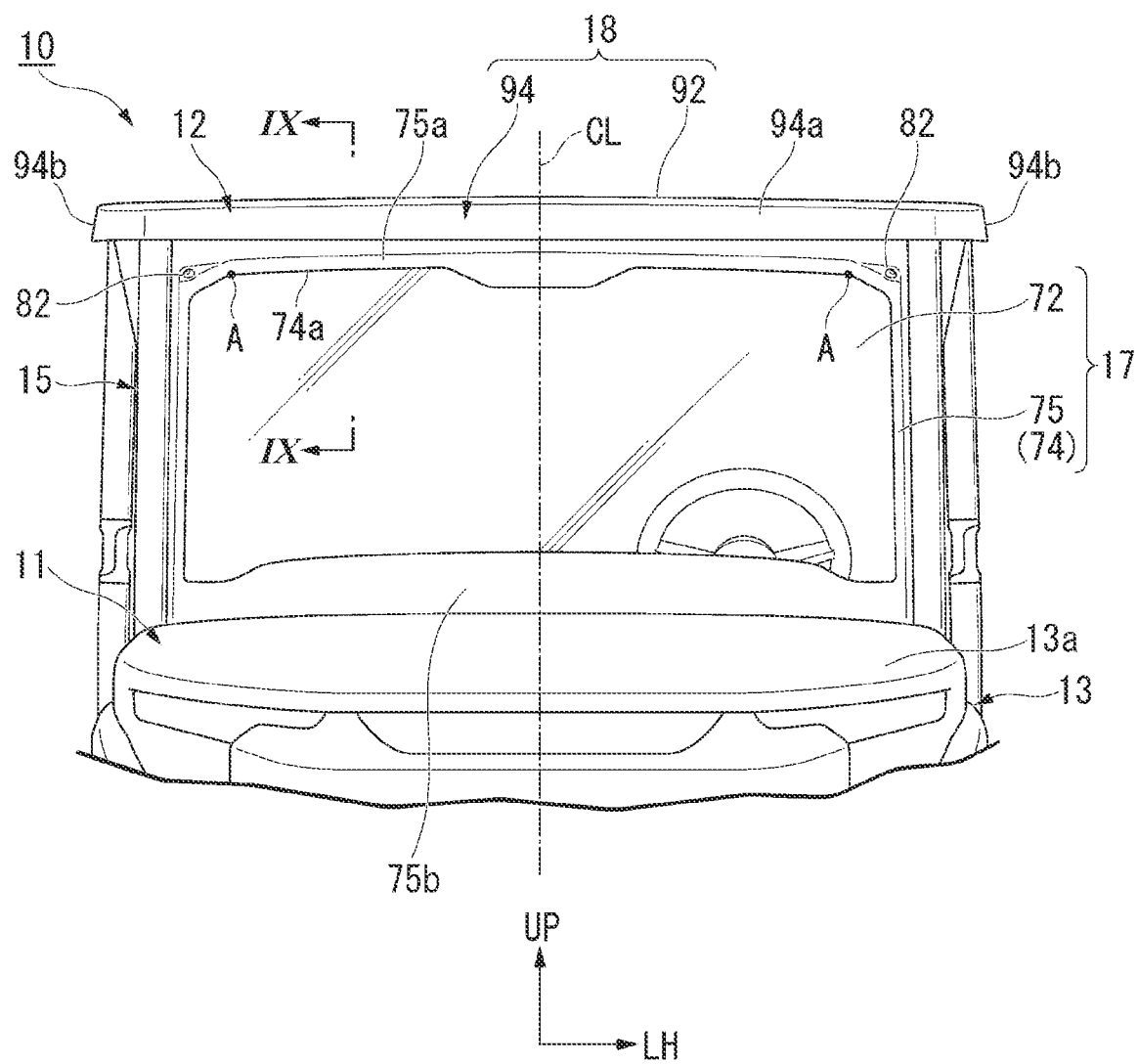
FIG. 2 is a front view of an upper portion of a cabin of the vehicle when the vehicle is seen from a forward side.
Figure 3:
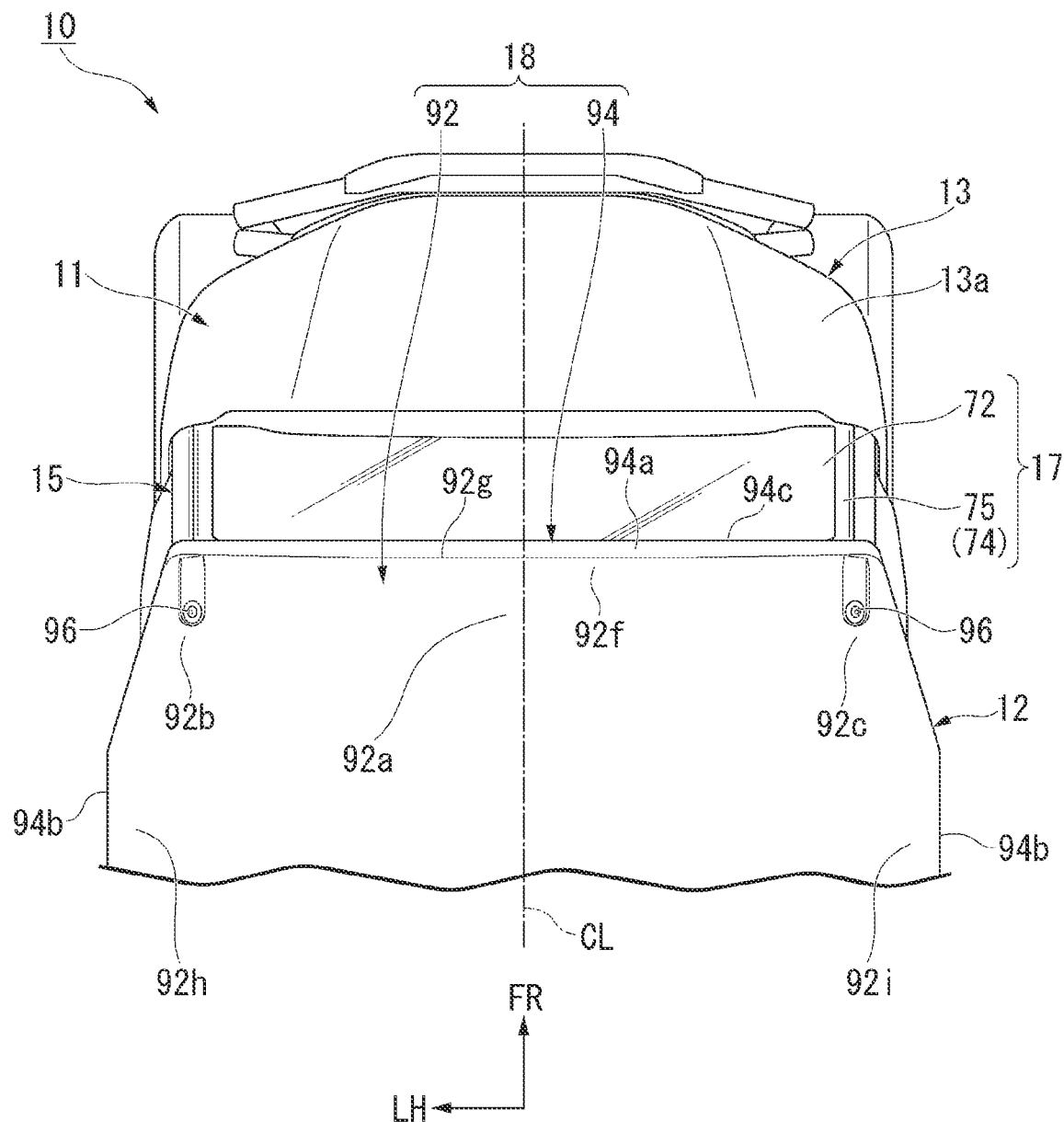
FIG. 3 is a plan view of a vehicle body front portion of the vehicle when the vehicle is seen from above.

FIG. 1 is a side view showing a vehicle 10 of an embodiment. FIG. 2 is a front view of an upper portion of a cabin 12 of the vehicle 10 of the embodiment when the vehicle is seen from a forward side. FIG. 3 is a plan view of a vehicle body front portion of the vehicle 10 of the embodiment when the vehicle is seen from above.

As shown in FIG. 1 to FIG. 3, the vehicle 10 is a four-wheeled vehicle in which, for example, three people can ride side by side. The vehicle 10 is, for example, a so-called side-by-side type multi utility vehicle (MUV) mainly intended for traveling on uneven ground or the like. Further, the vehicle 10 is not limited to the MUV.

The vehicle 10 includes a vehicle body 11 on which the cabin 12 or the like in which occupants ride is provided. The vehicle body 11 includes a front body 13 provided in front of the cabin 12, a rear body 14 provided behind the cabin 12, and a lower body 12L provided below the cabin 12. The vehicle body 11 constitutes a vehicle body frame (not shown) that bridges between the front body 13, the lower body 12L and the rear body 14.

A hood 13a configured to cover a driving source is disposed above the front body 13. A cargo stand 14a is disposed above the rear body 14. The lower body 12L constitutes a frame of a lower portion of the cabin 12. A frame of an upper portion of the cabin 12 is constituted by a roll bar assembly (hereinafter, simply referred to as a roll bar) 15.

In the upper portion of the cabin 12, a passenger space 12C is separated off by the roll bar 15 assembled in a frame shape.

Figure 4:
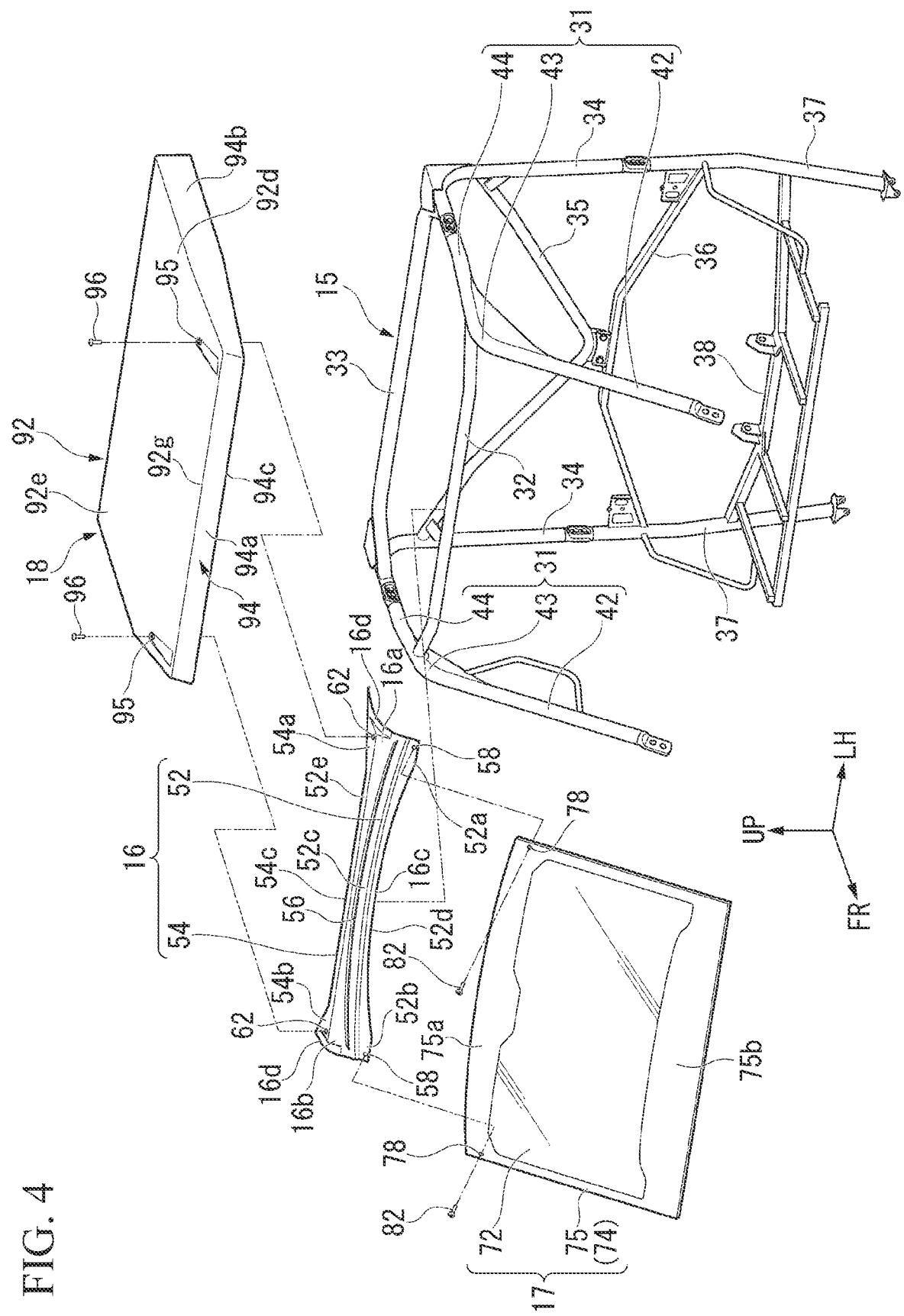
FIG. 4 is an exploded perspective view showing the upper portion of the cabin of the vehicle.

FIG. 4 is an exploded schematic perspective view of the upper portion of the cabin 12 of the vehicle 10 of the embodiment.

As shown in FIG. 1 and FIG. 4, the upper portion of the cabin 12 includes the roll bar 15, a windshield 17, and a roof 18.

<Roll Bar>

As shown in FIG. 1 and FIG. 4, the roll bar 15 is assembled above the vehicle body 11 (the lower body 12L) of the vehicle 10 and defines the passenger space 12C. The roll bar 15 is a frame member with high rigidity that constitutes a frame of the cabin 12. In FIG. 4, a state in which a reinforcement member 16 is removed, which will be described below, is shown.

Figure 5:
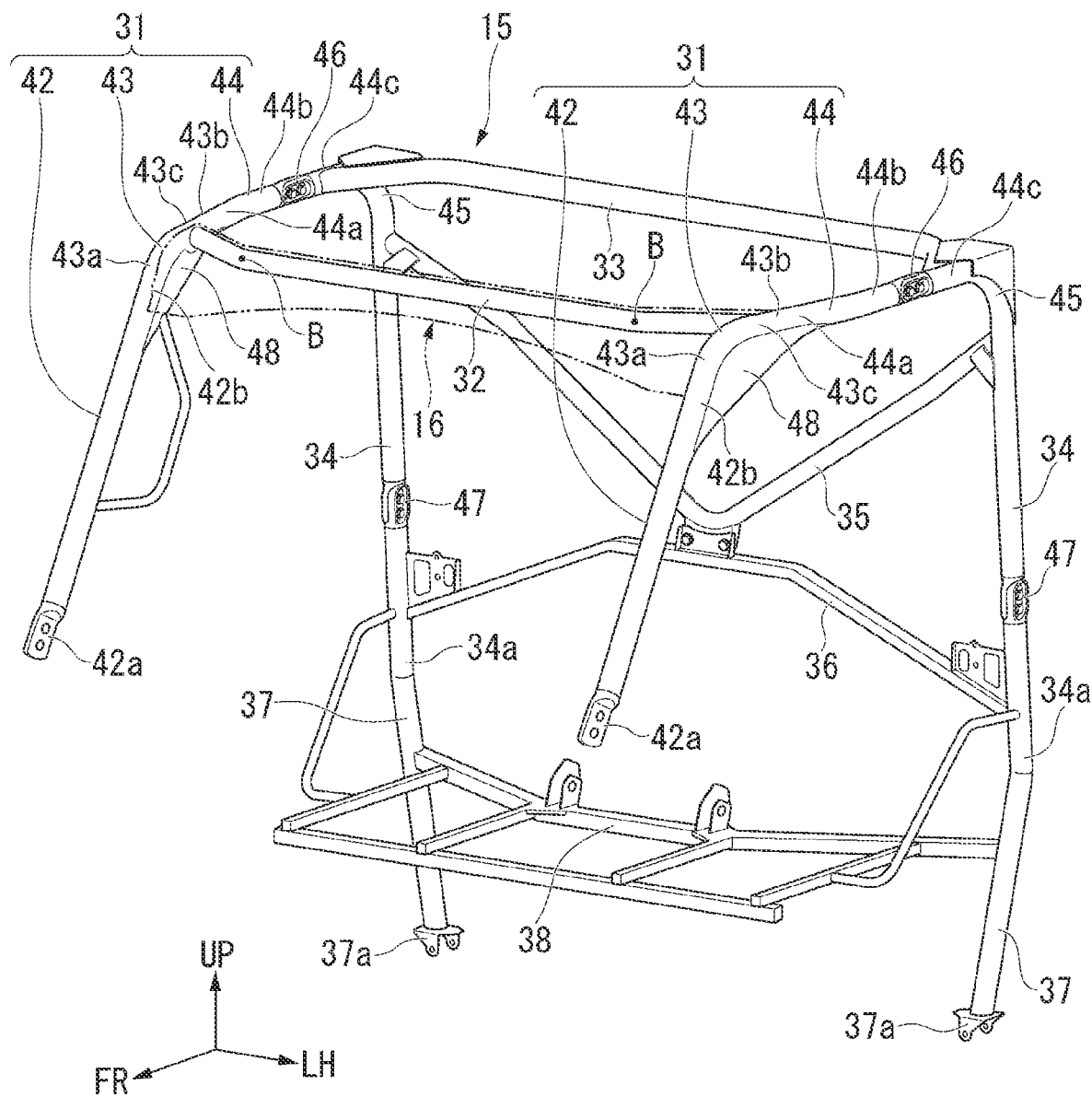
FIG. 5 is a perspective view showing a roll bar provided in the cabin.

FIG. 5 is a perspective view showing the roll bar 15 included in the cabin 12 according to the embodiment.

As shown in FIG. 4 and FIG. 5, the roll bar 15 includes a pair of left and right front roll bars 31, a front upper cross roll bar 32, a rear upper cross roll bar 33, a pair of left and right rear roll bars 34, a first rear center cross roll bar 35, a second rear center cross roll bar 36, a pair of left and right rear under roll bars 37, and a rear under cross roll bar 38.

The pair of left and right front roll bars 31, the pair of left and right rear roll bars 34, and the pair of left and right rear under roll bars 37 are designated by the same reference signs because they have a substantially symmetrical configuration. Hereinafter, the pair of left and right front roll bars 31 may be simply referred to as the front roll bars 31.

The left front roll bar 31 has a left windshield bar 42, a left curved portion 43, and a left roof bar 44. Similarly, the right front roll bar 31 has a right windshield bar 42, a right curved portion 43, and a right roof bar 44. The left and right front roll bars 31 are each integrally formed by bending a single steel pipe, or the like.

The pair of left and right windshield bars 42, the pair of left and right curved portions 43, and the pair of left and right roof bars 44 are designated by the same reference sign because they have a substantially symmetrical configuration. Hereinafter, the pair of left and right windshield bars 42 may be simply referred to as the windshield bars 42, the pair of left and right curved portions 43 may be simply referred to as the curved portions 43, and the pair of left and right roof bars 44 may be simply referred to as the roof bars 44.

In the pair of left and right windshield bars 42, lower end portions 42a are connected to a frame portion such as a vehicle body frame or the like (not shown) on both sides of an upper rear portion of the front body 13 of the vehicle body 11 in a vehicle width direction. The windshield bars 42 extend linearly in the upward/downward direction on both sides of a front portion of the roll bar 15, respectively. Specifically, each of the windshield bars 42 extends upward from the lower end portion 42a and is inclined to be disposed further rearward as it goes upward when seen in a side view. Each of the windshield bars 42 extends in the upward/downward direction when seen in a front view. An upper end portion 42b of each of the windshield bars 42 is continuous integrally with a lower portion of the curved portion 43 on the same side.

The curved portions 43 are curved in an arc shape from the upper end portions 42b of the windshield bars 42 toward the rear of the vehicle when seen in a side view. Hereinafter, an area (lower portion) of the windshield bar 42 of the curved portion 43 on the side of the upper end portion 42b may be referred to as "the first curved portion 43a." A front end portion 44a of the roof bar 44 on the same side is continuous integrally with a rear end portion 43b of the curved portion 43.

The roof bars 44 extend from the rear end portions 43b of the curved portions 43 toward the rear of the vehicle. Hereinafter, an area of the curved portion 43 on the side of the front end portion 44a of the roof bar 44 (i.e., an area of the curved portion 43 on the side of the rear end portion 43b, a rear portion) may be referred to as "the second curved portion 43c." In the roof bar 44, a front roof bar 44b and a rear roof bar 44c are integrally connected by a connecting member 46.

The front roll bars 31 form integrally with the windshield bars 42, the curved portions 43, and the front roof bars 44b. The rear roof bar 44c is continuous integrally with an upper end portion of the rear roll bar 34 via a rear curved portion 45. The rear roll bar 34 is split vertically via a rear connecting member 47. The rear under roll bars 37 are continuous integrally with lower end portions of the rear roll bars 34.

In the pair of left and right front roll bars 31, the pair of left and right curved portions 43 are connected by the front upper cross roll bar 32. In the front upper cross roll bar 32, both side portions in the vehicle width direction are curved rearward when seen in a plan view, and both end portions in the vehicle width direction are coupled to the vicinities of the rear end portions 43b of the curved portions 43, respectively. The front upper cross roll bar 32 is reinforced by the panel-shaped reinforcement member (cross member) 16. The reinforcement member 16 is a member configured to connect the pair of left and right front roll bars 31.

The curved portions 43 are formed in upper front portions of the front roll bars 31 to be curved in an arc shape when seen in a side view. The upper front portions of the pair of left and right front roll bars 31 are connected by connection of the left and right curved portions 43. The front upper cross roll bar 32 extends in the vehicle width direction to bridge between the left curved portion 43 and the right curved portion 43. Reinforcement gusset 48 that bridges between the upper end portions 42b of the windshield bars 42, the curved portions 43 and the front end portions 44a of the roof bars 44 are coupled to inner circumferential sides of the curved portions 43 when seen in a side view.

In the pair of left and right front roll bars 31, the rear end portions of the pair of left and right roof bars 44 are connected by the rear upper cross roll bar 33. The rear upper cross roll bar 33 extends in the vehicle width direction to bridge between a rear end portion of the left roof bar 44 and a rear end portion of the right roof bar 44.

The pair of left and right rear roll bars 34 are continuous integrally with the rear end portions of the pair of left and right roof bars 44 via the rear curved portions 45, respectively. The pair of left and right rear roll bars 34 extend downward from the lower end portions of the pair of left and right rear curved portions 45. Each of the pair of left and right rear roll bars 34 is vertically split. Upper split bodies of the rear roll bars 34 are connected by the first rear center cross roll bar 35, lower split bodies of the rear roll bars 34 are connected by the second rear center cross roll bar 36, and the first rear center cross roll bar 35 and the second rear center cross roll bar 36 are also connected to each other at a center portion in the vehicle width direction.

The pair of left and right rear under roll bars 37 extend downward from lower end portions 34*a* of the pair of left and right rear roll bars 34. In the pair of left and right rear under roll bars 37, lower end portions 37*a* are connected to a frame portion such as a vehicle body frame or the like (not shown) at both sides of the upper front portion of the rear body 14 of the vehicle body 11 in the vehicle width direction, respectively. The pair of left and right rear under roll bars 37 are connected by the rear under cross roll bar 38.

<Reinforcement Member>

Figure 6:
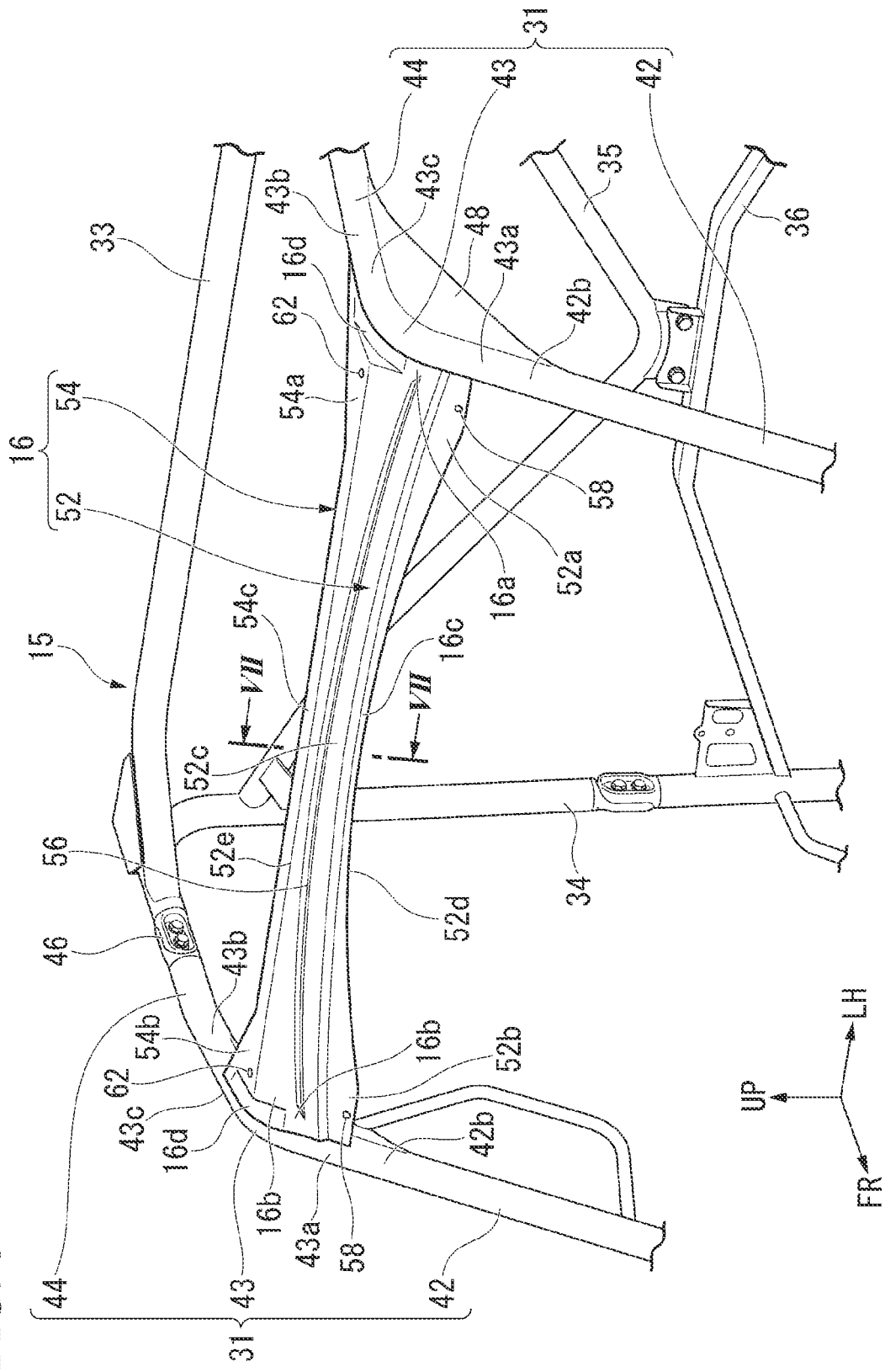
FIG. 6 is a perspective view showing a vicinity of a reinforcement member of the roll bar.
Figure 7:
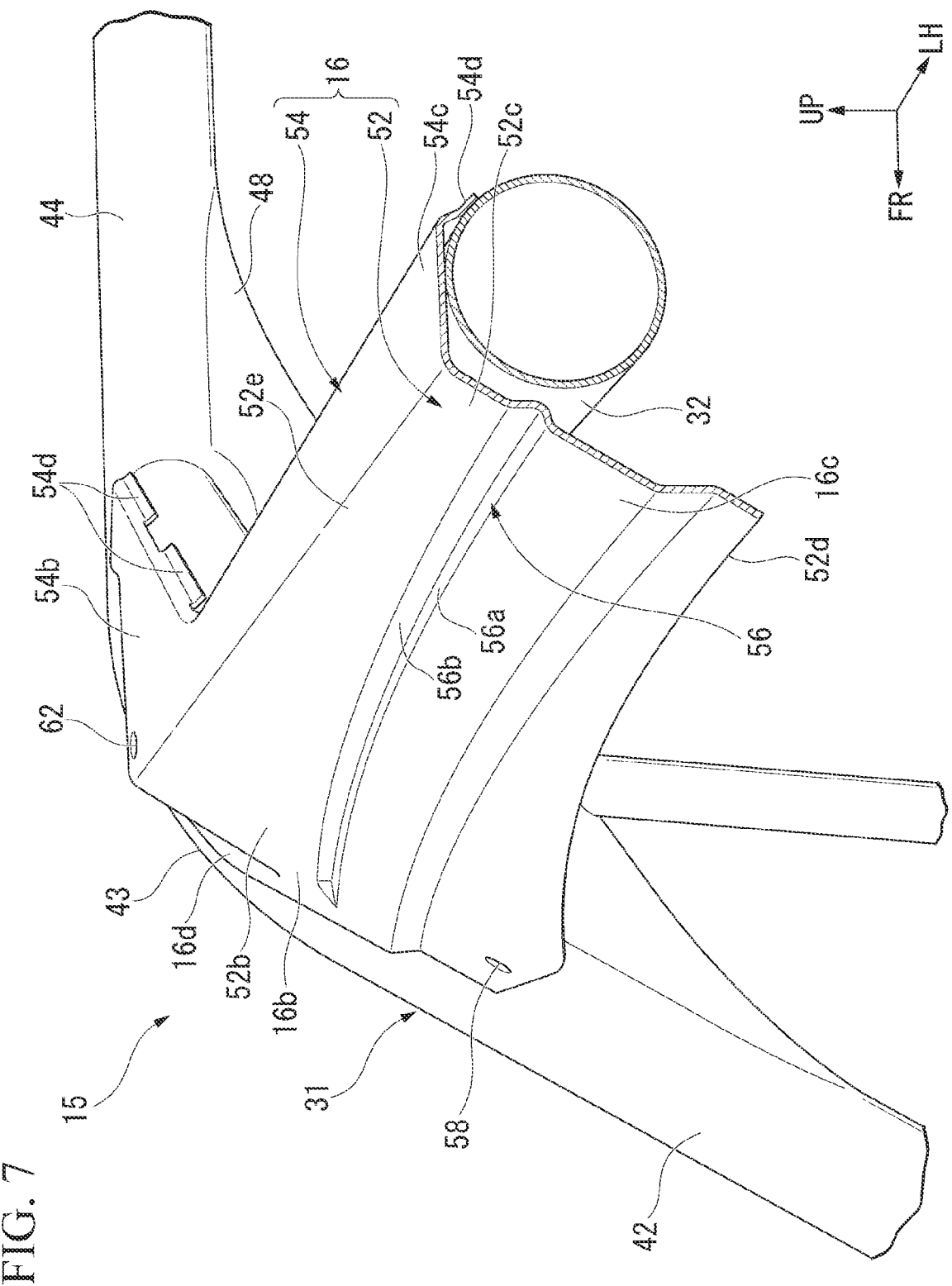
FIG. 7 is a perspective view including a cross section along line VII-VII in FIG. 6.

FIG. 6 is a perspective view showing peripheries of the reinforcement member 16 of the roll bar 15 of the embodiment. FIG. 7 is a perspective view including a cross section along line VII-VII in FIG. 6.

As shown in FIG. 4, FIG. 6 and FIG. 7, the roll bar 15 includes the reinforcement member 16 that connects the front upper portions of the pair of left and right front roll bars 31. Similarly, the reinforcement member 16 reinforces the front upper cross roll bar 32 that connects the front upper portions of the pair of left and right front roll bars 31.

The reinforcement member 16 has a V-shaped cross-sectional shape at a cross section perpendicular to the vehicle width direction and extends in the vehicle width direction. The reinforcement member 16 integrally has a windshield reinforcement member (front panel portion) 52 and a roof reinforcement member (upper panel portion) 54. In the reinforcement member 16, the windshield reinforcement member 52 and the roof reinforcement member 54 are formed integrally by folding a steel plate extending in the vehicle width direction in a V-shaped cross section. Both end portions of the reinforcement member 16 in the vehicle width direction (lengthwise direction) are referred to as a left end portion (one end portion) 16*a* and a right end portion (the other end portion) 16*b*, respectively. The reinforcement member 16 includes a center portion 16*c* provided between the left end portion 16*a* and the right end portion 16*b* in the vehicle width direction. The center portion 16*c* is an area located at a lateral center CL of the vehicle.

The one end portion 16*a* and the other end portion 16*b* according to the embodiment include a range of a prescribed width from a tip of the reinforcement member 16 to an inner side in the vehicle width direction. This range is exemplified as, for example, a range outside an origin A (see FIG. 2) where a change such as bending or the like occurs in a vehicle width direction in both side portions of an upper edge portion 74*a* extending linearly in the vehicle width direction in a frame portion of the windshield 17 (a windshield frame body 74, which will be described below), a range outside an origin B (see FIG. 5) where a change such as bending or the like occurs in the vehicle width direction both side portions of the front upper cross roll bar 32 extending linearly in the vehicle width direction, or the like.

The windshield reinforcement member 52 is formed in a panel shape along a virtual plane that connects linear center axes in the pair of left and right windshield bars 42 (a reference surface that bridges between the pair of left and right windshield bars 42).

The roof reinforcement member 54 is formed in a panel shape along a virtual plane that connects linear center axes in the pair of left and right roof bars 44 (a reference surface that bridges between the pair of left and right roof bars 44).

In the reinforcement member 16, the windshield reinforcement member 52 and the roof reinforcement member 54, which are separate members, may be configured by being integrally coupled to each other through welding or the like, or further, the windshield reinforcement member 52 and the roof reinforcement member 54 may be separately provided without being coupled to each other.

Both end portions of the windshield reinforcement member 52 in the vehicle width direction (lengthwise direction) are referred to as a left end portion (one end portion) 52*a* and a right end portion (the other end portion) 52*b*, respectively. Both end portions of the roof reinforcement member 54 in the vehicle width direction (lengthwise direction) are referred to as a left end portion (one end portion) 54*a* and a right end portion (the other end portion) 54*b*, respectively. The left end portion 16*a* of the reinforcement member 16 is formed by the left end portions 52*a* and 54*a* of the windshield reinforcement member 52 and the roof reinforcement member 54. The right end portion 16*b* of the reinforcement member 16 is formed by the right end portions 52*b* and 54*b* of the windshield reinforcement member 52 and the roof reinforcement member 54. The center portion 16*c* of the reinforcement member 16 is formed by center portions 52*c* and 54*c* of the windshield reinforcement member 52 and the roof reinforcement member 54.

Both the end portions 52*a* and 52*b* of the windshield reinforcement member 52 in the vehicle width direction are disposed to overlap the front roll bars 31 from the front of the vehicle in a range from the first curved portion 43*a* (the lower portions of the curved portions 43) to the upper end portions 42*b* of the windshield bars 42.

In both the end portions 16*a* and 16*b* of the reinforcement member 16 in the vehicle width direction, the arc-shaped portion 16*d* is formed in a range overlapping the front roll bars 31 in the vehicle width direction along outer circumferential portions of the curved portions 43 when seen in a side view. The arc-shaped portion 16*d* is formed to chamfer a V-shaped cross-sectional shape of the reinforcement member 16. A tip of the arc-shaped portion 16*d* on the outer side in the vehicle width direction abuts the outer circumferential portion of the curved portion 43 when seen in a side view, and they are integrally coupled by welding or the like. In addition, a tip of the windshield reinforcement member 52 on the outer side in the vehicle width direction abuts an outer surface of the upper end portion 42*b* of the windshield bar 42, and they are integrally coupled by welding or the like. In addition, a tip of the roof reinforcement member 54 on the outer side in the vehicle width direction abuts the outer surface of the front end portion 44*a* of the roof bar 44, and they are integrally coupled by welding or the like.

The roof reinforcement member 54 causes a lower surface to abut an upper end portion of the front upper cross roll bar 32. A coupling flange 54*d* extending to be bent downward obliquely and abutting the outer surface of the front upper cross roll bar 32 is formed on a rear edge portion of the roof reinforcement member 54. The rear edge portion of the roof reinforcement member 54 is integrally coupled to an outer surface of the front upper cross roll bar 32 via the coupling flange 54*d* by welding or the like. For example, while the windshield reinforcement member 52 is disposed such that the rear surface is separated forward from the outer surface of the front upper cross roll bar 32, it may abut the front upper cross roll bar 32 and be integrally coupled thereto through welding or the like.

The left end portion 52a of the windshield reinforcement member 52 is provided in a range of a lateral width of the left end portion 16a of the reinforcement member 16 and forms a lower portion of the left end portion 16a. The left end portion 52a of the windshield reinforcement member 52 abuts the left front roll bar 31 from the front of the vehicle (specifically, the left first curved portion 43a and the upper end portion 42b of the left windshield bar 42) and is integrally coupled thereto through welding or the like. A windshield fixing hole (windshield fixing portion) 58 is provided in the left end portion 52a of the windshield reinforcement member 52.

The right end portion 52b of the windshield reinforcement member 52 is provided in a range of a lateral width of the right end portion 16b of the reinforcement member 16 and forms a lower portion of the right end portion 16b. The right end portion 52b of the windshield reinforcement member 52 abuts the right front roll bar 31 from the front of the vehicle (specifically, the right first curved portion 43a and the upper end portion 42b of the right windshield bar 42) and is integrally coupled thereto through welding or the like. A windshield fixing hole (windshield fixing portion) 58 is provided in the right end portion 52b of the windshield reinforcement member 52.

The windshield reinforcement member 52 includes a center portion 52c between the left end portion 52a and the right end portion 52b in the vehicle width direction. The center portion 52c is an area located at the lateral center CL of the vehicle. The windshield reinforcement member 52 is formed in an arc shape such that a lower end 52d protrudes upward when the vehicle is seen in a front view. The windshield reinforcement member 52 is formed such that an upper end 52e has a horizontally linear shape when the vehicle is seen in a front view. Accordingly, the windshield reinforcement member 52 is formed such that the center portion 52c reduces a width in the upward/downward direction smaller than the left end portion 52a and the right end portion 52b. In other words, the windshield reinforcement member 52 is formed to increase the width in the upward/downward direction from the center portion 52c toward the left end portion 52a and the right end portion 52b.

A groove portion 56 is formed in an up-to-down intermediate portion of the windshield reinforcement member 52. The groove portion 56 has an aspect recessed from the panel main body portion (flat portion) along a reference surface that bridges between the left and right windshield bars 42 in the windshield reinforcement member 52 toward the rear of the vehicle. The groove portion 56 extends to be oriented in the vehicle width direction and is formed continuously from the left end portion 52a of the windshield reinforcement member 52 to the right end portion 52b.

The groove portion 56 has a lower end 56a facing an upper side of the vehicle and an upper end 56b facing a lower side of the vehicle with respect to the flat portion. The groove portion 56 functions as a reinforcement bead of the panel-shaped windshield reinforcement member 52. While the groove portion 56 ends in the middle of the left end portion 52a and the right end portion 52b of the windshield reinforcement member 52, it may extend to the tip of the windshield reinforcement member 52 and be coupled to the front roll bars 31.

At least the lower end 56a of the groove portion 56 is formed in an arc shape that protrudes upward along the lower end 52d of the windshield reinforcement member 52 when the vehicle is seen in a front view. The upper end 56b of the groove portion 56 is formed in an arc shape similar to the lower end 56a when the vehicle is seen in a front view. That is, the groove portion 56 extends with a constant up-to-down width in the vehicle width direction and extends to be inclined and disposed downward outward in the vehicle width direction. The "inclination" of the groove portion 56 includes the curve like the embodiment, a stepped shape as long as it is entirely inclined, and an aspect that displaces in a step difference shape, in addition to a linear inclination.

Figure 9:
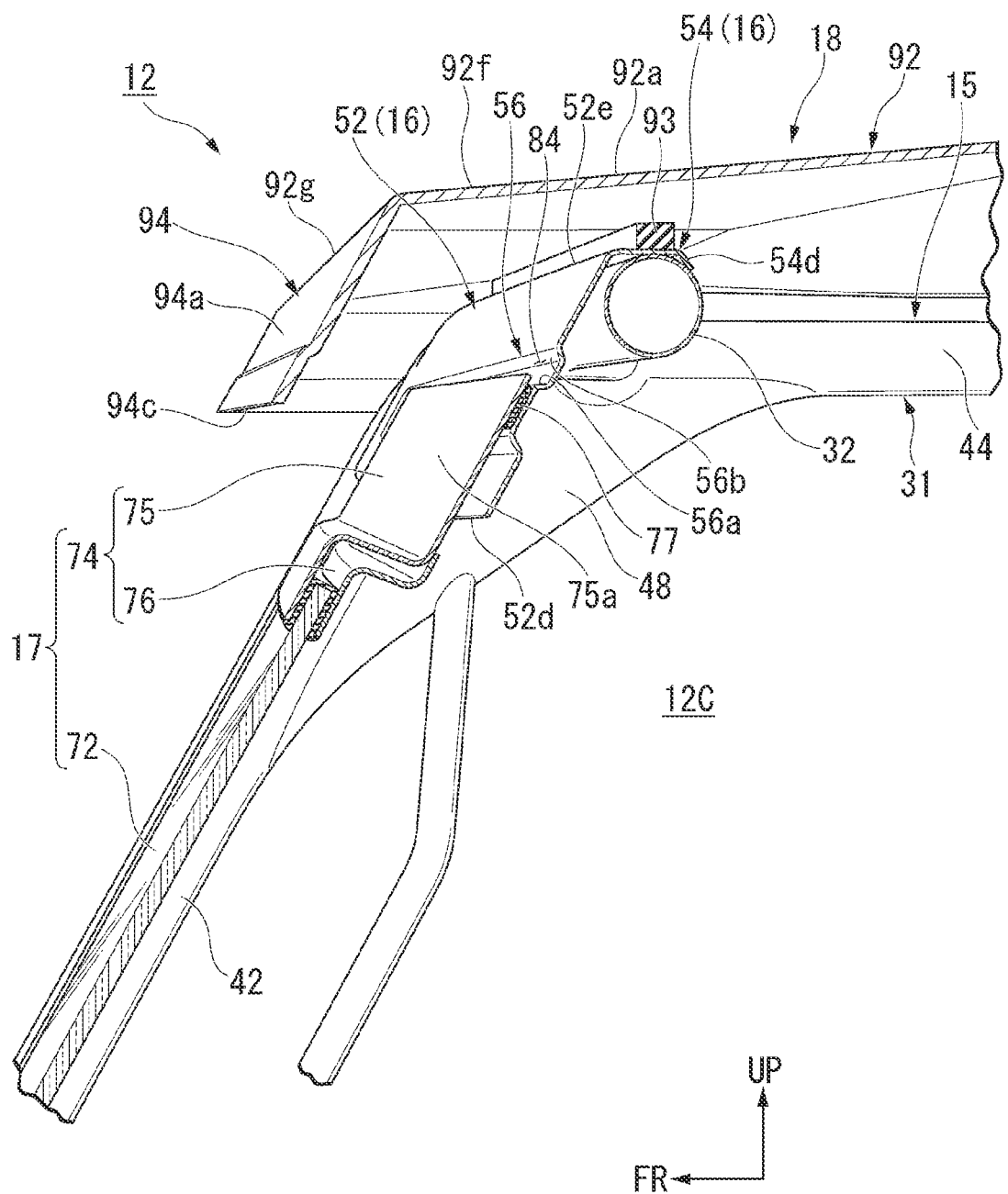
FIG. 9 is a perspective view including a cross section along line IX-IX in FIG. 2.

In addition, the groove portion 56 is disposed at a position overlapping an eaves portion 94 of the roof 18 when the vehicle is seen in a front view (see FIG. 9).

While the groove portion 56 is entirely inclined (curved) from the center portion 52c of the windshield reinforcement member 52 to the left and right end portions 52a and 52b in the embodiment, there is no limitation to the configuration. For example, a center region including the center portion 52c in the groove portion 56 is formed in a horizontally linear shape, and the groove portion 56 may be inclined downward in left and right side portions outside the center region. In addition, it is not limited to the configuration in which the groove portion 56 extends with a constant up-to-down width. For example, the upper end 56b of the groove portion 56 may have a curved shape having a curvature smaller than that of the lower end 56a or a linear shape, and the up-to-down width of the groove portion 56 may be increased outward in the vehicle width direction. In addition, for example, the upper end 56b of the groove portion 56 may have a curved shape having a curvature greater than that of the lower end 56a, and the up-to-down width of the groove portion 56 may be reduced outward in the vehicle width direction.

Figure 8:
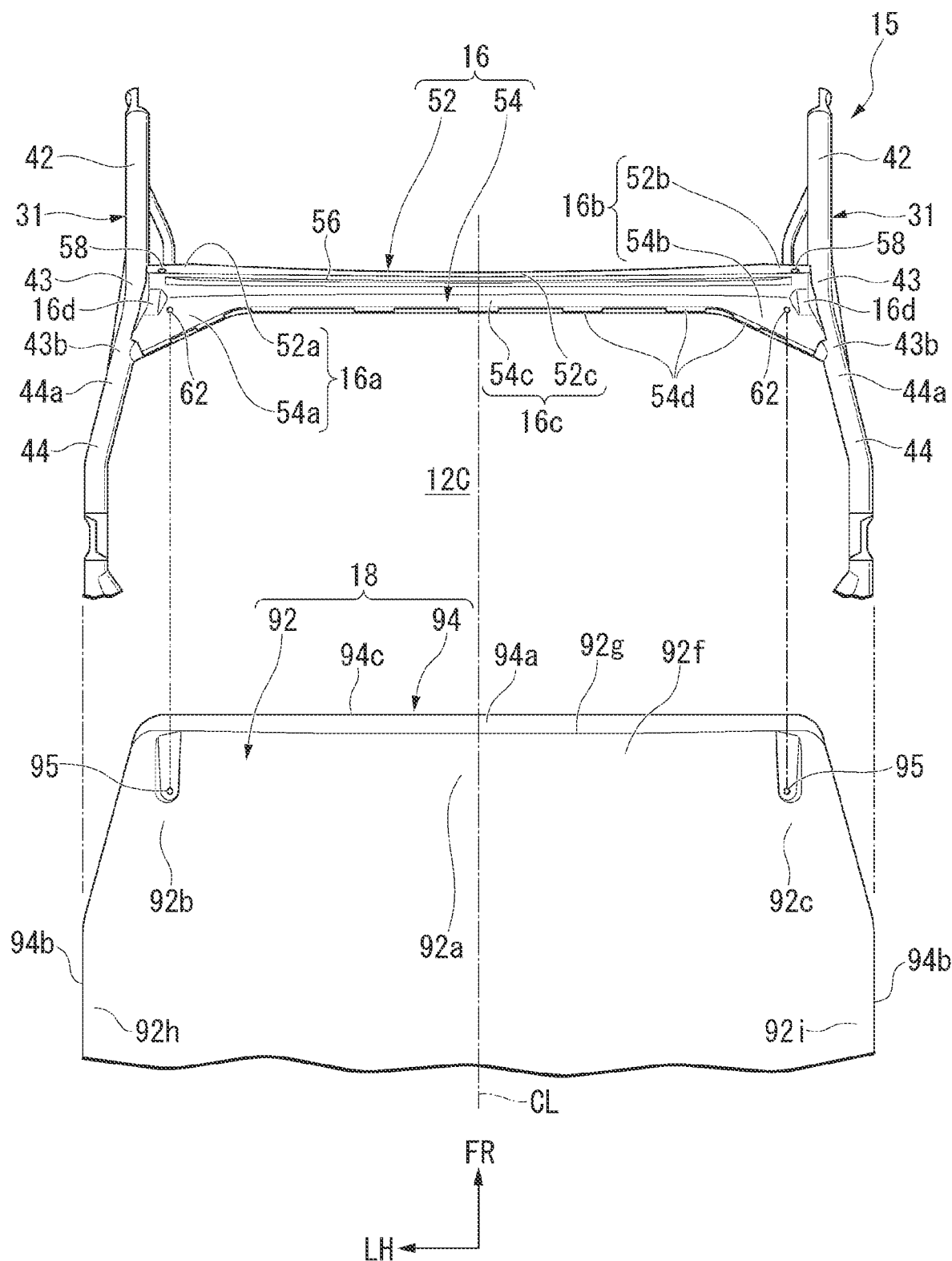
FIG. 8 is a plan view showing peripheries of the reinforcement member of the roll bar and a removed roof.

FIG. 8 is a plan view showing peripheries of the reinforcement member 16 of the roll bar 15 of the embodiment and the removed roof 18.

As shown in FIG. 6 to FIG. 8, the roof reinforcement member 54 extends from the upper end 52e of the windshield reinforcement member 52 toward the rear of the vehicle. The roof reinforcement member 54 includes a center portion 54c between the left end portion 54a and the right end portion 54b in the vehicle width direction. The center portion 54c is an area located at the lateral center CL of the vehicle. The center region including the center portion 54c of the roof reinforcement member 54 has a rear edge portion that linearly extends in the vehicle width direction.

The left end portion 54a and the right end portion 54b of the roof reinforcement member 54 are inclined such that rear edge portions are located rearward outward in the vehicle width direction. The front edge portion of the roof reinforcement member 54 (the upper end 52e of the windshield reinforcement member 52, the bent portion of the reinforcement member 52) extends linearly in the vehicle width direction. Accordingly, the roof reinforcement member 54 is formed such that the center region including the center portion 54c has a width in the forward/rearward direction smaller than the left end portion 54a and the right end portion 54b. In other words, the roof reinforcement member 54 is formed such that the width in the forward/rearward direction is increased from the center portion Mc toward the left end portion Ma and the right end portion 54b.

The left end portion Ma of the roof reinforcement member 54 abuts the left front roll bar 31 (specifically, the left second curved portion 43c and the front end portion 44a of the left roof bar 44) from an upper side of the vehicle and is integrally coupled thereto through welding or the like. The right end portion 54b of the roof reinforcement member 54 abuts the right front roll bar 31 (specifically, the right second curved portion 43c and the front end portion 44a of the right roof bar 44) from an upper side of the vehicle and is integrally coupled thereto through welding or the like. A roof fixing hole (roof fixing portion) 62 is provided in the left end portion 54a of the roof reinforcement member 54. A roof fixing hole (roof fixing portion) 62 is provided in the right end portion 54b of the roof reinforcement member 54.

The left end portion 16a of the reinforcement member 16 is formed by the left end portion 52a of the windshield reinforcement member 52 and the left end portion 54a of the roof reinforcement member 54. The right end portion 16a of the reinforcement member 16 is formed by the right end portion 52b of the windshield reinforcement member 52 and the right end portion 54b of the roof reinforcement member 54. Accordingly, the left end portion 16a of the reinforcement member 16 is coupled to the upper end portion 42b of the left windshield bar 42, the left first curved portion 43a, the left second curved portion 43c, and the front end portion 44a of the left roof bar 44. In addition, the right end portion 16b of the reinforcement member 16 is coupled to the upper end portion 42b of the right windshield bar 42, the right first curved portion 43a, the right second curved portion 43c, and the front end portion 44a of the right roof bar 44. The upper end portion 42b of the windshield bars 42, the first curved portion 43a, the second curved portion 43c, and the front end portion 44a of the left roof bar 44 form a front upper portion reinforced by the reinforcement member 16 in the roll bar 15.

In addition, the reinforcement member 16 is provided along the front upper cross roll bar 32. Accordingly, the reinforcement member 16 also functions as a reinforcement member that reinforces the front upper cross roll bar 32. The front upper cross roll bar 32 connects the upper portions of the pair of left and right front roll bars 31. Accordingly, the upper portions of the pair of left and right front roll bars 31 are strongly connected by the front upper cross roll bar 32 and the reinforcement member 16.

<Windshield>

FIG. 9 is a perspective view including a cross section along line IX-IX in FIG. 2.

As shown in FIG. 4 and FIG. 9, the windshield 17 is detachably attached to a front portion of the roll bar 15 (a forward side of the vehicle). When the vehicle is seen in a front view, the windshield 17 is formed in a rectangular appearance having left and right end portion extending along the pair of left and right windshield bars 42, an upper end portion extending along the front upper cross roll bar 32, and a lower end portion extending along a rear upper portion of the front body 13. The windshield 17 has an upper end portion extending in the vehicle width direction and attached to the windshield reinforcement member 52 of the reinforcement member 16.

The windshield 17 includes a windshield glass (front glass) 72 and the windshield frame body 74.

The windshield frame body 74 is formed in a frame shape along an outer circumferential portion of a rectangular windshield glass 72 when seen in a front view. The windshield frame body 74 has a first frame body 75 and a second frame body 76, which overlap each other in the forward/rearward direction.

The first frame body 75 is formed as a rectangular frame body so as to cover the outer circumference of the windshield glass 72 from the forward side of the vehicle. An upper portion 75a extending in the vehicle width direction of the first frame body 75 extends above the upper portion extending in the vehicle width direction like in the second frame body 76. In the upper portion 75a of the first frame body 75, attachment holes 78 are provided in the left and right end portions 16a and 16b of the reinforcement member 16 and the areas (the left end portion and the right end portion) overlapping each other in the vehicle width direction.

The second frame body 76 is formed as a rectangular frame body so as to cover the outer circumference of the windshield glass 72 from a rearward side of the vehicle (the side of the passenger space 12C). The first frame body 75 and the second frame body 76 are integrally connected while sandwiching the outer circumference of the windshield glass 72 in the vehicle forward/rearward direction.

The first frame body 75 and the second frame body 76 form inner circumferential shapes, which are identical to each other when the vehicle is seen in a front view. The inner circumferential shape of the first frame body 75 and the second frame body 76 corresponds to an opening shape of the windshield frame body 74. In the opening-shaped upper edge portion 74a of the windshield frame body 74, a center region in the vehicle width direction extends linearly in the vehicle width direction, and both side portions in the vehicle width direction extend to be bent downward.

The first frame body 75 is fixed to the windshield reinforcement member 52. The upper portion 75a of the first frame body 75 is fixed to the windshield reinforcement member 52 while overlapping it from a forward side of the vehicle. Specifically, a bolt 82 is inserted into the attachment hole 78 of the left end portion of the first frame body 75 and the left windshield fixing hole 58 from a forward side of the vehicle, and the bolt 82 is screwed and coupled to a nut (not shown) provided on a side of the rear surface of the windshield reinforcement member 52. Accordingly, the left end portion of the upper portion 75a of the first frame body 75 is attached to the left end portion 52a of the windshield reinforcement member 52.

In addition, the bolt 82 is inserted into the attachment hole 78 of the right end portion of the first frame body 75 and the right windshield fixing hole 58 from a forward side of the vehicle, and the bolt 82 is screwed and coupled to a nut (not shown) provided on a side of the rear surface of the windshield reinforcement member 52. Accordingly, the right end portion of the upper portion 75a of the first frame body 75 is attached to the right end portion 52b of the windshield reinforcement member 52.

The left end portion 52a of the windshield reinforcement member 52 forms the lower portion of the left end portion 16a of the reinforcement member 16, and the right end portion 52b of the windshield reinforcement member 52 forms the lower portion of the right end portion 16b of the reinforcement member 16. That is, the first frame body 75 is detachably attached to the lower portions of the left and right end portions 16a and 16b of the reinforcement member 16 using the windshield fixing hole 58, the bolt 82 and the nut (not shown).

Further, for example, a lower portion 75b extending in the vehicle width direction of the first frame body 75 is detachably attached to a rear upper portion of the front body 13 (see FIG. 1) using the bolt and the nut in the left and right end portions, like the upper portion 75a. In this state, the windshield 17 is provided on a forward side of the roll bar 15 and the passenger space 12C in the vehicle.

A seal member 77 is sandwiched between the upper portion 75a of the first frame body 75 and the windshield reinforcement member 52. The seal member 77 is located below the groove portion 56. A flat portion of the windshield reinforcement member 52 below the groove portion 56 forms a seal surface to which the seal member 77 is closely attached. A forward side of the flat portion of the windshield reinforcement member 52 in the vehicle is covered with the upper portion 75a of the first frame body 75 with a gap about a thickness of the seal member 77. Water that enters this gap is less likely to be drained without the groove portion 56. In the embodiment, a relatively large gap 84 (hereinafter, may be referred to as a gap 84 for drainage) is formed between the groove portion 56 and the upper portion 75a of the first frame body 75 by forming the groove portion 56 recessed in the windshield reinforcement member 52 toward the rear of the vehicle.

The upper portion of the groove portion 56 is located above the upper portion 75a of the first frame body 75, for example, in the center region in the vehicle width direction. Accordingly, in the gap 84 for drainage formed by the groove portion 56 and the upper portion 75a of the first frame body 75, an upper portion opens on a forward side of the first frame body 75 in the vehicle. The gap 84 for drainage is formed from the left end portion 52a of the windshield reinforcement member 52 to the right end portion 52b, like the groove portion 56. The gap 84 for drainage is formed in an arc shape protruding upward when the vehicle is seen in a front view, like the groove portion 56.

That is, the gap 84 for drainage is formed to be inclined and located downward as it is widened outward in the vehicle width direction. In addition, the gap 84 for drainage extends further outward in the vehicle width direction than the outer side end of the first frame body 75 and the windshield 17 in the vehicle width direction. The left and right end portions of the gap 84 for drainage extend to a position that avoids the windshield 17 when seen in a front view, and is opened on an outer side of the first frame body 75 in the vehicle width direction on a forward side of the vehicle. Hereinafter, the left end portion of the gap 84 for drainage may be referred to as a left opening end portion (opening end portion), and the right end portion may be referred to as a right opening end portion (opening end portion).

<Roof>

As shown in FIG. 4, FIG. 8 and FIG. 9, the roof 18 is attached to the upper portion of the roll bar 15 from an upper side of the vehicle. The upper portion of the roll bar 15 corresponds to a substantially rectangular upper portion frame body formed by the front upper cross roll bar 32, left and the right roof bar 44, and the rear upper cross roll bar 33 in a plan view seen from above the vehicle. The roof 18 is a member that covers an upper side of the passenger space 12C by being placed and fixed on the upper portion of the roll bar 15 from above, reducing rain and sunlight hitting the occupant.

The roof 18 integrally has a roof main body 92 and the eaves portion 94.

The roof main body 92 is formed in a substantially rectangular shape when seen in a plan view to be placed on the upper portion of the roll bar 15 from above. The roof main body 92 has attachment holes 95 provided in a left end portion 92b and a right end portion 92c of a front portion 92a, respectively. The front portion 92a of the roof main body 92 is placed with respect to the roof reinforcement member 54 extending along the front upper cross roll bar 32 via a seal member 93. In this state, the attachment holes 95 of the left and right end portions 92b and 92c of the front portion 92a of the roof main body 92 are disposed to overlap the roof fixing holes 62 of the left and right end portions 54a and 54b of the roof reinforcement member 54, respectively.

Bolts 96 are inserted into the attachment holes 95 of the left and right end portions 92b and 92c of the front portion 92a of the roof main body 92 and the roof fixing holes 62 of the left and right end portions 54a and 54b of the roof reinforcement member 54 from an upper side of the vehicle, and the bolts 96 are screwed and coupled to nuts (not shown) provided on the side of the lower surface of the roof reinforcement member 54.

The left end portion 54a of the roof reinforcement member 54 forms the upper portion of the left end portion 16a of the reinforcement member 16, and the right end portion 54b of the roof reinforcement member 54 forms the upper portion of the right end portion 16b of the reinforcement member 16. That is, the front portion 92a of the roof main body 92 is detachably attached to the upper portions of the left and right end portions 16a and 16b of the reinforcement member 16 using the roof fixing holes 62, the bolts 96 and the nuts (not shown).

Further, in the roof main body 92, left and right end portions of an intermediate portion 92d (see FIG. 1) in the vehicle forward/rearward direction and left and right end portion of a rear portion 92e (see FIG. 1) in the vehicle forward/rearward direction are detachably attached using bolts and nuts, for example, like the front portion 92a. In this state, the roof main body 92 and the roof 18 are provided above the roll bar 15 and the passenger space 12C of the vehicle.

The eaves portion 94 is provided on a peripheral portion of the roof main body 92 when seen in a plan view (in the embodiment, a front side portion 92f and left and right side portions 92h and 92i). The eaves portion 94 has, for example, a first eaves portion 94a and a second eaves portion 94b. The first eaves portion 94a is provided on the front side portion 92f of the roof main body 92. The first eaves portion 94a extends downward from a front tip 92g of the front side portion 92f to be inclined and located forward as it goes downward. The first eaves portion 94a hangs down to, for example, a height overlapping the upper portion 75a of the first frame body 75 in the upward/downward direction, and disposes a lower tip 94c in front of the upper portion of the first frame body 75.

The first eaves portion 94a hangs down to a height overlapping the groove portion 56 of the reinforcement member 16 in the upward/downward direction. While an upper part of the first eaves portion 94a partially overlaps the upper portion 75a of the first frame body 75 in the upward/downward direction (i.e., overlaps when seen in the forward/rearward direction), it is provided to overlap substantially entirely the groove portion 56 in the upward/downward direction (overlaps when seen in the forward/rearward direction). The groove portion 56 can be hidden from view by the first eaves portion 94a (the roof 18) when the upper portion of the roll bar 15 is seen from the front of the vehicle as long as the first eaves portion 94a is disposed to overlap the entirety of the groove portion 56 in the upward/downward direction.

As described above, the vehicle 10 according to the embodiment includes the roll bar 15 assembled to the upper portion of the vehicle body 11 and separates off the passenger space 12C. The roll bar 15 includes the pair of left and right front roll bars 31, and the reinforcement member 16 configured to connect the pair of left and right front roll bars 31. The front roll bars 31 include the windshield bars 42 extending on both sides of the front portion of the roll bar 15 in the upward/downward direction, respectively. The reinforcement member 16 has the windshield reinforcement member 52 along the reference surface that bridges between center axes of the pair of left and right windshield bars 42. The groove portion 56 recessed rearward from the flat portion along the reference surface and extending in the vehicle width direction is formed in the windshield reinforcement member 52, and the groove portion 56 is located lower in the outer end portion in the vehicle width direction than in the center portion in the vehicle width direction.

According to the configuration, the reinforcement member 16 of the front upper portion of the roll bar 15 has the windshield reinforcement member 52 along the reference surface that bridges between the pair of left and right windshield bars 42, and forms the groove portion 56 facing the windshield reinforcement member 52 in the vehicle width direction. Accordingly, when the windshield 17 is attached to the front portion of the roll bar 15, the gap 84 (the gap 84 for drainage) extending in the vehicle width direction is formed between the groove portion 56 of the windshield reinforcement member 52 and the first frame body 75 (specifically, the upper portion 75a) of the windshield 17. For this reason, water that enters between the windshield reinforcement member 52 and the first frame body 75 during washing or the like of the vehicle 10 is guided and drained to the outside of the windshield reinforcement member 52 in the vehicle width direction through the groove portion 56 (i.e., the gap 84 for drainage). In this way, the water that enters between the windshield reinforcement member 52 of the front upper portion of the roll bar 15 and the upper portion 75a of the first frame body 75 can be efficiently drained.

In addition, in the vehicle 10, the roll bar 15 includes the front upper cross roll bar 32 configured to connect the pair of left and right front roll bars 31. The reinforcement member 16 is a reinforcement member that overlaps the front upper cross roll bar 32 in the upward/downward direction when the vehicle is seen in a front view and reinforces the front upper cross roll bar 32.

According to the configuration, the reinforcement member 16 that connects the pair of left and right front roll bars 31, which functions as the reinforcement member of the front upper cross roll bar 32 of the front upper portion of the roll bar 15, effectively reinforces the front upper portion of the roll bar 15 and easily maintains the passenger space 12C. As a result, water that enters between the reinforcement member 16 of the front upper portion of the roll bar 15 and the windshield 17 can be efficiently drained.

In addition, in the vehicle 10, the reinforcement member 16 has the left end portion 16a and the right end portion 16b connected to the pair of left and right front roll bars 31. The groove portion 56 is formed continuously to bridge between the lower portion of the left end portion 16a and the lower portion of the right end portion 16b. In other words, the groove portion 56 is formed to bridge between the left end portion 52a and the right end portion 52b of the windshield reinforcement member 52 to be continuous with the windshield reinforcement member 52.

According to the configuration, the groove portion 56 is formed continuously to bridge between the left end portion 52a and the right end portion 52b of the windshield reinforcement member 52. Accordingly, the water that enters between the windshield reinforcement member 52 and the upper portion 75a of the first frame body 75 can be guided to the groove portion 56 (the gap 84 for drainage), and the water guided to the gap 84 for drainage can be smoothly guided to the left opening end portion and the right opening end portion outward in the vehicle width direction. Accordingly, the water that enters between the windshield reinforcement member 52 and the upper portion 75a of the first frame body 75 can be reliably drained outward in the vehicle width direction through the gap 84 for drainage.

In addition, in the vehicle 10, the groove portion 56 is inclined to be located downward as it goes outward in the vehicle width direction.

According to the configuration, the water guided to the groove portion 56 (the gap 84 for drainage) can be more smoothly guided toward an outer side in the vehicle width direction by inclining the groove portion 56 to be located downward as it goes outward in the vehicle width direction. Accordingly, the water that enters between the windshield reinforcement member 52 and the upper portion 75a of the first frame body can be more reliably drained to the outer side in the vehicle width direction through the gap 84 for drainage.

In addition, in the vehicle 10, the reinforcement member 16 has the center portion 16c between the left end portion 16a and the right end portion 16b in the vehicle width direction. In the reinforcement member 16, the width of the windshield reinforcement member 52 in the upward/downward direction is greater in the left end portion 16a and the right end portion 16b than in the center portion 16c between the left end portion 16a and the right end portion 16b in the vehicle width direction.

In other words, the windshield reinforcement member 52 of the reinforcement member 16 has the center portion 52c between the left end portion 52a and the right end portion 52b in the vehicle width direction. In the windshield reinforcement member 52, the width in the upward/downward direction is greater in the left end portion 52a and the right end portion 52b than in the center portion 52c.

According to the configuration, the width in the upward/downward direction is greater in the left end portion 52a and the right end portion 52b than in the center portion 52c of the windshield reinforcement member 52. In the left end portion 52a and the right end portion 52b of the windshield reinforcement member 52, in order to connect the pair of left and right windshield bars 42 or fix the windshield 17, it is desirable to increase the width in the upward/downward direction. For this reason, by increasing the up-to-down width of the left and right end portions 52a and 52b of the windshield reinforcement member 52, the left and right end portions 52a and 52b of the windshield reinforcement member 52 can be strongly connected to the pair of left and right windshield bars 42 and the windshield 17 can be easily fixed. In addition, in comparison with the case in which the up-to-down width of the entire windshield reinforcement member 52 is increased, reduction in weight of the windshield reinforcement member 52 and the reinforcement member 16 can be achieved. Further, a field of view when a front upper side is seen from the passenger space 12C can be widened. In addition, the outer end portion of the groove portion 56 can be positioned lower.

In addition, in the vehicle 10, each of the lower end 52d of the reinforcement member 16 (the windshield reinforcement member 52) and the lower end 56a of the groove portion 56 is formed in an arc shape protruding upward when the vehicle is seen in a front view.

According to the configuration, by forming the lower end 52d of the windshield reinforcement member 52 in an arc shape, in comparison with the case in which the lower end 52d of the windshield reinforcement member 52 is formed in a linear shape, the up-to-down width of the windshield reinforcement member 52 on the outer side in the vehicle width direction can be easily increased. That is, the up-to-down width of the windshield reinforcement member 52 can be increased from the center portion 52c of the windshield reinforcement member 52 toward the left and right end portions 52a and 52b. In addition, by forming the lower end 52d of the windshield reinforcement member 52 in a smooth arc shape, in comparison with the case in which the lower end 52d of the windshield reinforcement member 52 is formed in a bent shape, a step difference shape, or the like, it is possible to suppress stress concentration in the lower end 52d of the windshield reinforcement member 52 and increase strength of the windshield reinforcement member 52 and the reinforcement member 16.

In addition, by forming the lower end 56a of the groove portion 56 in an arc shape along the lower end 52d of the windshield reinforcement member 52, the lower end 56a of the groove portion 56 can be efficiently formed according to the shape of the lower end 52d of the windshield reinforcement member 52. Further, water that enters between the reinforcement member 16 and the upper portion 75a of the first frame body 75 can be smoothly guided to an outer side in the vehicle width direction along the lower end 56a of the groove portion 56.

In addition, in the vehicle 10, the windshield fixing holes 58 configured to attach the first frame body 75 of the windshield 17 is provided on the windshield reinforcement member 52 in the left end portion 16a and the right end portion 16b of the reinforcement member 16. That is, the windshield fixing holes 58 are provided in the left end portion 52a and the right end portion 52b of the windshield reinforcement member 52.

According to the configuration, in the left and right end portions 16a and 16b of the reinforcement member 16, since the windshield fixing holes 58 are provided in the left and right end portions 52a and 52b with the increased up-to-down width in the windshield reinforcement member 52, a degree of attachment freedom of the windshield 17 can be increased using the windshield reinforcement member 52 with the increased up-to-down width.

In addition, in the vehicle 10, the reinforcement member 16 includes the roof reinforcement member 54 extending rearward from the upper end 52e of the windshield reinforcement member 52. In the reinforcement member 16, the width of the roof reinforcement member 54 in the forward/rearward direction is greater in the left end portion 16a and the right end portion 16b than in the center portion 16c between the left end portion 16a and the right end portion 16b in the vehicle width direction. The roof fixing holes 62 configured to attach the roof 18 is provided on the roof reinforcement member 54 in the left end portion 16a and the right end portion 16b of the reinforcement member 16.

In other words, the roof reinforcement member 54 of the reinforcement member 16 has the center portion 54c between the left end portion 54a and the right end portion 54b in the vehicle width direction. The width of the roof reinforcement member 54 in the forward/rearward direction is greater in the left end portion 54a and the right end portion 54b than in the center portion 54c. The roof fixing holes 62 to which the roof 18 is attached are provided in the left end portion 54a and the right end portion 54b of the roof reinforcement member 54.

According to the configuration, since the width in the forward/rearward direction is greater in the left and right end portions 54a and 54b than in the center portion 54c of the roof reinforcement member 54 and the roof fixing holes 62 are provided in the left and right end portions 54a and 54b, a degree of attachment freedom of the roof 18 can be increased using the roof reinforcement member 54 with the increased front-to-rear width.

In addition, in the vehicle 10, the groove portion 56 is disposed to overlap the first eaves portion 94a of the roof 18 when the vehicle is seen in a front view.

According to the configuration, since the groove portion 56 is disposed to overlap the first eaves portion 94a of the roof 18 when the vehicle is seen in a front view, the groove portion 56 is hidden by the first eaves portion 94a of the roof 18 to make it difficult to see the groove portion 56 from the outside of the vehicle 10, thereby enhancing appearance characteristics of the vehicle 10.

The present invention is not limited to the above-mentioned embodiment, and for example, it may be applied to various types of vehicles such as two-wheeled or three-wheeled vehicles as well as the above-mentioned four-wheeled vehicles.

The form of securing the gap for drainage between the cross member and the windshield is not limited to the groove portion. For example, any configuration that displaces the flat portion along the reference surface that bridges between the left and right windshield bars in the front panel portion to the rear of the vehicle to form a gap between the flat portion and the windshield, and that forms an upward surface that receives water like the lower end 56a of the groove portion 56 may be provided.

In addition, while the example in which the windshield 17 and the roof 18 are attached (fixed) to the reinforcement member 16 by the bolts and nuts has been described in the embodiment, there is no limitation thereto. As another example, the windshield 17 and the roof 18 may be fixed to the reinforcement member 16 using another fixing means such as a rivet, welding, or the like.

Then, the configuration according to the above-mentioned embodiment is an example of the present invention, and various modifications may be made without departing from the spirit of the present invention, such as replacing the components of the embodiment with known components.

What is claimed is:

1. A vehicle comprising a roll bar assembled to an upper portion of a vehicle body and configured to separate off a passenger space,
    wherein the roll bar includes a pair of left and right front roll bars and a cross member configured to connect the pair of left and right front roll bars,
    the front roll bars include windshield bars extending on both sides of a front portion of the roll bar in an upward/downward direction, respectively, and
    the cross member has a front panel portion along a reference surface that bridges between center axes of the pair of left and right windshield bars, a groove portion recessed rearward from a flat portion along the reference surface and extending in a vehicle width direction is formed in the front panel portion, and the groove portion is located lower in an outer end portion in the vehicle width direction than in a center portion in the vehicle width direction.

2. The vehicle according to claim 1, wherein the roll bar includes a front upper cross roll bar configured to connect the pair of left and right front roll bars, and
    the cross member is a reinforcement member overlapping the front upper cross roll bar in the upward/downward direction when the vehicle is seen in a front view and reinforcing the front upper cross roll bar.

3. The vehicle according to claim 1, wherein the cross member has one end portion and the other end portion connected to the pair of left and right front roll bar, respectively, and
    the groove portion is formed continuously to bridge between the one end portion and the other end portion.

4. The vehicle according to claim 3, wherein the groove portion is inclined to be located further downward as it goes outward in the vehicle width direction.

5. The vehicle according to claim 3, wherein the cross member has a width of the front panel portion in the upward/downward direction, which is greater in the one end portion and the other end portion than in a center portion between the one end portion and the other end portion in the vehicle width direction.

6. The vehicle according to claim 5, wherein each of a lower end of the front panel portion and the groove portion is formed in an arc shape protruding upward when the vehicle is seen in a front view.

7. The vehicle according to claim 6, wherein a windshield fixing portion configured to attach a windshield is provided on the front panel portion in the one end portion and the other end portion of the cross member.

8. The vehicle according to claim 3, wherein the cross member includes an upper panel portion extending rearward from an upper end of the front panel portion, the cross member has a width of the upper panel portion in a forward/rearward direction, which is greater in the one end portion and the other end portion than in a center portion between the one end portion and the other end portion in the vehicle width direction, and a roof fixing portion configured to attach a roof is provided on the upper panel portion in the one end portion and the other end portion of the cross member.

9. The vehicle according to claim 8, wherein the groove portion is disposed to overlap an eaves portion of the roof when the vehicle is seen in a front view.

* * * * *